(12) United States Patent
Heidari et al.

(10) Patent No.: US 8,599,780 B2
(45) Date of Patent: Dec. 3, 2013

(54) ACCESS POINT RANGE EXTENSION

(75) Inventors: Sam Heidari, Los Altos Hills, CA (US);
Ali Rouhi, Oakland, CA (US);
Rajkumar Samuel, San Jose, CA (US)

(73) Assignee: Quantenna Communications, Inc., Fremont, CA (US)

( * ) Notice: Subject to any disclaimer, the term of this patent is extended or adjusted under 35 U.S.C. 154(b) by 261 days.

(21) Appl. No.: 13/096,885

(22) Filed: Apr. 28, 2011

(65) Prior Publication Data

US 2011/0268060 A1 Nov. 3, 2011

Related U.S. Application Data

(60) Provisional application No. 61/329,053, filed on Apr. 28, 2010.

(51) Int. Cl.
*H04W 84/02* (2009.01)

(52) U.S. Cl.
USPC ........... 370/329; 370/338; 370/328; 370/401; 370/352; 455/466; 455/412.1; 455/414.1; 455/445

(58) Field of Classification Search
USPC ................. 370/329, 338, 328, 401, 352, 332; 455/466, 412.1, 414.1, 436, 445
See application file for complete search history.

(56) References Cited

U.S. PATENT DOCUMENTS

| | | | | |
|---|---|---|---|---|
| 6,125,279 | A * | 9/2000 | Hyziak et al. | 455/445 |
| 6,236,653 | B1 * | 5/2001 | Dalton et al. | 370/352 |
| 7,808,959 | B2 * | 10/2010 | Guo | 370/338 |
| 8,107,414 | B2 * | 1/2012 | Wang et al. | 370/328 |
| 8,233,934 | B2 * | 7/2012 | Ahmavaara et al. | 455/552.1 |
| 2001/0009856 | A1 * | 7/2001 | Kang et al. | 455/456 |
| 2005/0259619 | A1 * | 11/2005 | Boettle et al. | 370/331 |
| 2007/0097898 | A1 * | 5/2007 | Juang | 370/315 |

* cited by examiner

*Primary Examiner* — Rasheed Gidado (57) ABSTRACT

A technique for expanding the range of coverage for a wireless local area network (WLAN) involves locating a wireless access point (WAP) away from an interworking unit (IWU) at the edges of the WLAN and a (typically) wired network. The WAP, when located away from the IWU, can be referred to as an untethered access point (UAP) because it communicates with the IWU on a wireless channel. Stations on the WLAN will be capable of communicating with the WAP, whether or not it is a UAP, via a known or convenient wireless protocol, such as Wi-Fi, and may or may not be capable of communicating with one another via a direct station-to-station protocol.

1 Claim, 6 Drawing Sheets

ACCESS POINT RANGE EXTENSION

CROSS-REFERENCE TO RELATED APPLICATIONS

The present application claims priority to U.S. Provisional Patent App. No. 61/329,053, filed on Apr. 28, 2010, which is incorporated by reference.

BACKGROUND

A typical wireless network usually comprises at least one wireless access point (WAP) through which stations can connect to a wireless network. A common wireless network is a Wi-Fi network, which is a non-technical description that is generally correlated with the IEEE 802.11 standards, as well as Wi-Fi Protected Access (WPA) and WPA2 security standards, and the Extensible Authentication Protocol (EAP) standard, (Wi-Fi certification currently requires conformance with these standards.) A wireless network can include a wireless local area network (WLAN) or a network of some other size.

In a simple wireless network deployment, a WAP is responsible for relaying information between two stations (STA). This can consume twice the bandwidth as directly sending information from a first STA to a second STA due to the fact that transmission one STA to AP and AP to second STA takes two time slots. Even though there are mechanisms to avoid this in order to save airtime bandwidth, there may be benefits of relaying the information by AP to extend the range between two stations that are far apart. In a sense, the AP can become a range extender or repeater for them.

If every STA goes through an AP to communication with other STAB, it requires twice the airtime or throughput will be halved. For example, a STA can be located next to a broadband access connection, such as a digital subscriber line (DSL), to provide external communication, while an AP is centrally located to have the most coverage. In a simple configuration like this, to have an external broadband connection, other STAs must go through the AP to reach the STA next to the broadband AP. This will reduce throughput of the system by half. Therefore, the selection of the location of the AP is a delicate act to maximize the throughput within a home network.

The foregoing examples of the related art are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for expanding the range of coverage for a wireless local area network (WLAN) involves locating a wireless access point (WAP) away from an interworking unit (IWU) at the edges of the WLAN and a (typically) wired network. The WAP, when located away from the IWU, can be referred to as an untethered access point (UAP) because it communicates with the IWU on a wireless channel. Stations on the WLAN will be capable of communicating with the WAP, whether or not it is a UAP, via a known or convenient wireless protocol, such as Wi-Fi, and may or may not be capable of communicating with one another via a direct station-to-station protocol.

It can be desirable to include an engine for determining an optimal location for a UAP. The primary purpose of such an engine is to increase the range of the WAP in the WLAN. To this end, it may be desirable to perform WLAN analysis and perform bandwidth matrix optimization. The engine can then dynamically select a WAP from all or a subset of the stations on the WLAN, and configure the station to function as a WAP.

The description in this paper describes this technique and examples of systems implementing this technique.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
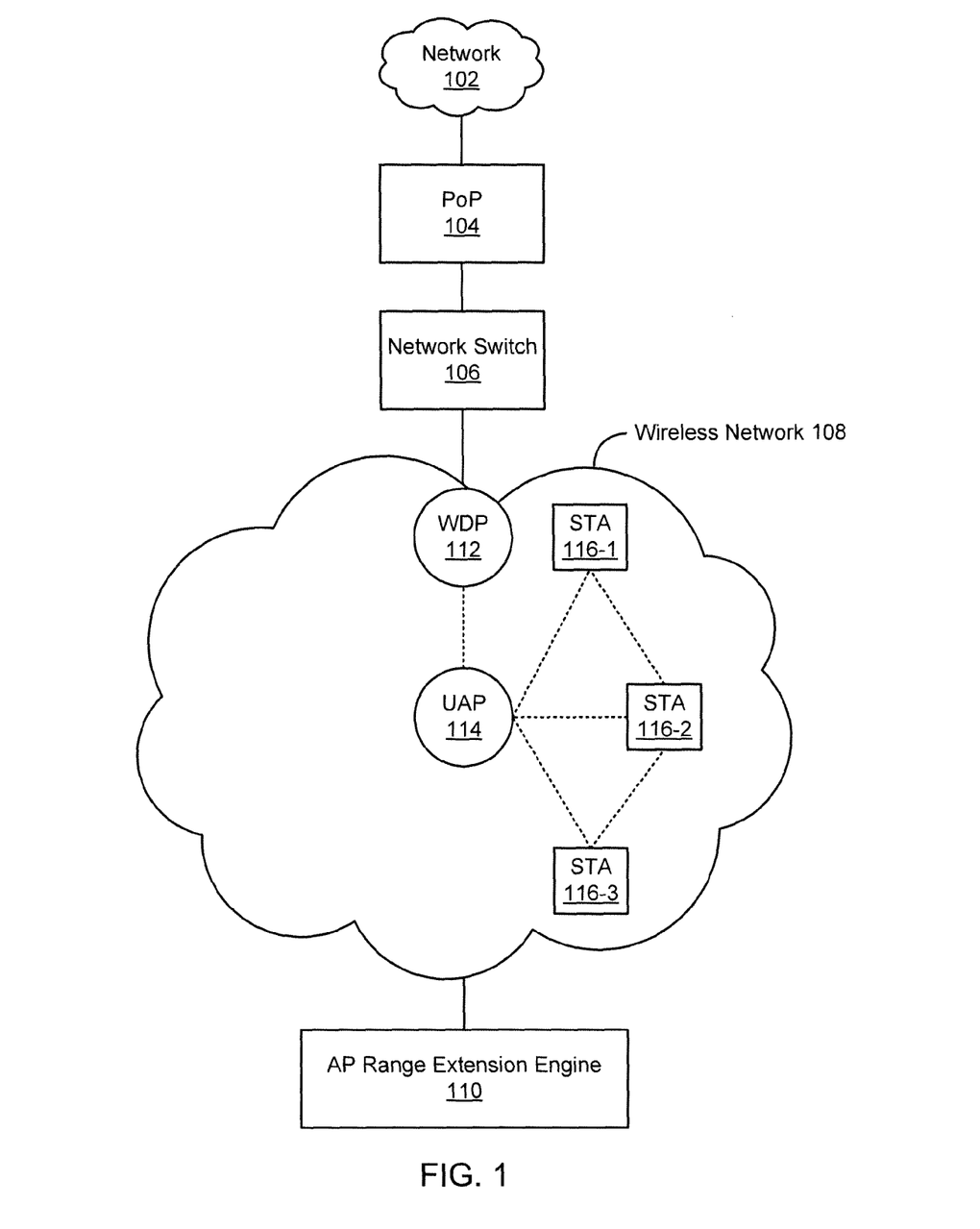
FIG. 1 depicts an example of an extended range access point (AP) system.

FIG. 1 depicts an example of an extended range access point (AP) system 100. The system 100 includes network 102, a point of presence (PoP) 104, network switch 106, a wireless network 108, and an AP range extension engine 110. The wireless network 108 includes a wireless distribution point (WDP) 112, an untethered access point (UAP) 114, and zero or more stations (STA) 116-1 to 116-3 (referred to collectively as STAs 116). A computer system that can be used in the system 100 is described later with reference to FIG. 3.

In the example of FIG. 1, the network 102 may be practically any type of communications network, such as the Internet. The network 102 could be a smaller network, such as a wide area network (WAN), metropolitan are network (MAN), campus area network (CAN), or local area network (LAN), but the network 102 could at least theoretically be of any size. Networks that are coupled to the network 102 can be referred to as "on" the network 102. Networks can include enterprise private networks and virtual private networks (collectively, private networks). As the name suggests, private networks are under the control of an entity rather than being open to the public. Private networks include a head office and optional regional offices (collectively, offices). Many offices enable remote users to connect to the private network offices via some other network, such as the Internet.

In the example of FIG. 1, the PoP 104 includes an access point to the network 102. The term "PoP" is frequently used with reference to an access point to the Internet, but is used more broadly in this paper to mean an access point to the network 102. In a typical implementation, the PoP 104 could include servers, routers, ATM switches, digital/analog call aggregators, etc. The PoP 104 can be part of the facilities of a telecommunications provider that an Internet service provider (ISP) rents or a location separate from a telecommunications provider. The PoP 104 can be referred to as "on" the network 102. In this paper, the PoP 104 is considered to include the components of the system 100 that are under the control of a party that provides access to the network 102 or a service thereof; the party can be referred to as a network service provider (NSP) which is a superset of ISP.

In the example of FIG. 1, the network switch 106 is coupled to the PoP 104. The network switch 106 includes a computer networking device that connects network segments. The network switch 106 can also include port mirroring, firewall, network intrusion detection, performance analysis, and other applicable known or convenient engines.

In a specific implementation, the network switch 106 includes a network bridge that processes and routes data in the data link layer (layer 2) of the OSI model. For example, an Ethernet switch operates at the data link layer. However, the network switch 106 could be implemented as a multilayer switch that also processes data at the network layer (layer 3) and/or transport layer (layer 4). A network hub or repeater operates on the physical layer (layer 1) and typically receives data on a port of entry and broadcasts out on every port other than the port of entry. The network switch 106 would not typically be a passive network device such as a hub, which falls outside of the definition of "network switch" as used in this paper, but within the definition of a "networking device" as used in this paper.

The network switch 106 can be implemented in a converged device such as a gateway to access broadband services such as digital subscriber line (DSL) or cable internet. The converged device would typically include components that interface to the particular broadband technology, such as a protocol converter, and can include a telephone interface for voice over IP (VoIP). The term "broadband" is a relative term. For example, broadband Internet access is typically contrasted with dial-up access using a 56 k modem. In a specific implementation, the term broadband can be used to mean at least equivalent to a DSL, which is about 70 Mbps. For example, 70 Mbps could include 6 Mbps of Internet access, 30 Mbps of broadcast video, and 35 Mbps of switched digital video (give or take). In Ethernet provided over cable modem is a common alternative to DSL; and the term broadband should be interpreted to mean equivalent to that of 100BASE-T Ethernet, as well. In telecommunication, a very narrow band can carry Morse code, a narrow band will carry speech (voiceband), and a still broader band will carry real-time multimedia. Only the latter would normally be considered "broadband." However, it may be noted that a voice line could be converted to a non-laded twisted-pair wire (no telephone filters) to become hundreds of kilohertz wide (broadband) and can carry several Mbps. Thus, the term broadband in this paper should include equivalent to ADSL, which, depending upon the implemented standard can be from 2 Mpbs to 27.5 Mbps. As another example, digital signal 3 (DS3) is a digital signal level 3 T-carrier, also referred to as a T3 line, with a data rate of 44.736 Mpbs, which would be considered in the "broadband" range. Currently, a sophisticated consumer expectation for broadband range for Internet access would be perhaps 44 Mbps or higher, or perhaps approximately 70-100 Mbps, but it should be understood that the definition of broadband could change over time to include different, presumably higher, Mbps than those just described, and different consumer expectations.

In the example of FIG. 1, the wireless network 108 can include a small office/home (SOHO) wireless network. As such, the wireless network 108 can be implemented as part of a home area network (HAN) or more generally as part of a LAN, where the wireless network 108 is referred to as the wireless part of the HAN or LAN, e.g., a wireless HAN (WHAN) or a wireless LAN (WLAN). There is no particular reason to limit the wireless network 108 to a SOHO network implementation, but as a network implementation increases in size, the probability increases that there will be multiple network switches 106. The example of FIG. 1 does not illustrate a distinction between different overlapping wireless networks. For instance, a WHAN could include a Wi-Fi network, a bluetooth network, an infrared network, and/or some other type of wireless network, all of which could be treated as part of the wireless network 108. Alternatively, the different networks could be treated as distinct wireless networks.

For illustrative simplicity, it is assumed that there are multiple STAs 116, but one of skill in the relevant art would understand that a wireless access point need not have any associated stations at any given time. A station, as used in this paper, may be referred to as a device with a media access control (MAC) address and a physical layer (PHY) interface to a wireless medium that complies with the IEEE 802.11 standard. Thus, for example, the WDP 112 and the UAP 114 can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. In alternative embodiments, a station may comply with a different standard than IEEE 802.11, may be referred to as something other than a "station," and may have different interfaces to a wireless or other medium.

Conceptually, the wireless network 108, since it is not an ad hoc network, will by definition include a WAP. In a typical, e.g., Wi-Fi network the WDP 112 and the UAP 114 would be one in the same, and would generally be referred to as the WAP. For this reason, in this paper, while the WDP 112 can arguably be defined as an access point it is not referred to as a WAP because it is not the access point to the wireless network 108 for wireless STAs 116. Similarly, care is taken with reference to the UAP 114, which functions as a WAP, but is operationally connected to a wired network through another station (the WDP 112).

As is illustrated in the example of FIG. 1 with dotted lines, STA-to-STA communication is permitted via a known or convenient communications protocol in the wireless network 108. This is useful to reduce the airtime overhead of going through APs for every STA-to-STA communication. Thus, STA 116-1 can communicate with STA 116-2 via, e.g., data link something (DLS) protocol, and STA 116-2 can communicate with STA 116-3 via the DLS protocol. Optionally, stations close to the WDP 112 could also communicate with the WDP 112 via DLS (not shown). For illustrative purposes, STA 116-1 and STA 116-3 do not have a direct connection because they cannot hear one another. It is expected that the reason STA 116-1 and STA 116-3 cannot hear one another is because they are too far from one another or there is interference between them. In some instances, the stations could be treated as unable to hear one another because the signal is too weak. Thus, in general, stations can be referred to as unable to hear one another when a signal detection engine determines that a received signal strength indicator (RSSI) does not meet a DLS initiation threshold.

The STAs 116 can communicate with the UAP 114 using, e.g., Wi-Fi or some other network standard to form a connection between a non-AP station (the STAs 116) and an AP station (the UAP 114). As was previously mentioned, for illustrative purposes STA 116-1 and STA 116-3 cannot necessarily hear one another. When STA 116-1 and STA 116-3 communicate with one another, they can do so through the, e.g. Wi-Fi link with the UAP 114. Thus, the UAP 114 acts as a "router" between STA 116-1 and STA 116-3.

The UAP 114 can communicate with the WDP 112 using, e.g., Wi-Fi or some other network standard to form a connection between a non-AP station (the WDP 112) and an AP station (the UAP 114). In this case, although the WDP 112 is at the edges of the wireless network and the (typically) wired network, the WDP 112 is not acting as the WAP, but is rather serving a dual function as a non-AP station in the wireless network 108 and a (typically) wired interworking unit (IWU) coupled to the network switch 106. However, data that is sent from the wireless network 108 to the network 102 passes through the WDP 112, and data that is received from the network 102 for distribution on the wireless network 108 passes through the WDP 112.

Given the description above, a WDP can be defined as a non-AP STA on a wireless network that is configured to communicate with a WAP on the wireless network and to interface with another network. In a specific implementation, the "interface with another network" refers to a wired connection to a broadband access node. In a specific implementation, a networking device includes both WDP and network switching functionality. That is, although the network switch 106 and the WDP 112 are illustrated as distinct components, the network switch 106 and the WDP 112 can be implemented as a single physical device, such as a gateway device.

Given the description above, a UAP can be defined as a WAP on a wireless network with no wire connection to a broadband access node. In a specific implementation, the WAP, in the form of the UAP 114, can be located away from, e.g., a gateway at a more optimal location. A more optimal location can be determined after-the-fact by measuring throughput of the wireless network 108 and comparing the throughput to that measured when the WAP was located at the gateway location. The UAP 114 can also be referred to as located in a "central location," which means that comparing the wireless coverage of the UAP 114 to a map of a location, such as a house floorplan, shows that wireless devices on the map are more likely to be near the UAP 114 than a gateway location. It may be noted that a typical AP-location map will be expected to include both distance measurements and wireless obstacles, which can be objects, e.g., walls or appliances, or areas of expected interference. This can also be represented as a link map, where both actual distance and obstacles, which need not be quantified in a specific implementation, determine the quality of a link.

An advantage of implementing the UAP 114 separately from the WDP 112 is that the UAP 114 becomes a natural repeater for far stations, such as the STA 116-3, which for illustrative purposes does not hear the WDP 112. Advantageously, stations that cannot even see one another can be connected via the UAP 114; so range extension may be improved by virtue of placing the UAP 114 apart from the WDP 112, presumably at an optimal and/or central location. The UAP 114 is a "natural repeater" because no special routing work is required for the UAP 114 to function as a repeater.

Another advantage of the UAP acting as a natural repeater is that there is no security hole, which would exist if a non-AP repeater station stored an unencrypted packet for a short time.

A problem to overcome when implementing the system 100 is that stations not following the prescribed protocols will have an extra hop to get to external locations, unless the optimal position of the UAP happens to be at the same place as the WDP. Another issue is that the system will experience the hidden node problem, which is a well-known problem in wireless networking in which a node is visible from a WAP, but not from other nodes communicating with the WAP, leading to difficulties in media access control.

The wireless network 108 can be implemented as a matrix mesh network. In the example of FIG. 1, if implemented with a matrix mesh network, matrix mesh elements are nodes within the wireless network 108. A mesh is not a "matrix mesh" unless at least one node has multiple antennas. Accordingly, at least one of the matrix mesh elements must have multiple antennas, or at least an antenna with multi-antenna functionality. The matrix mesh elements may or may not include data of their own, but a system can take advantage of matrix mesh element network characteristics in network architecture and/or protocols. In this way, the system can adapt to traffic and/or network demands by optimizing end-to-end transmissions from a client, through at least one of the matrix mesh elements, to a client. One implementation of a matrix mesh network is the VECTOR MESH™ network of Quantenna Communications, Inc. of Sunnyvale, Calif. The VECTOR MESH™ network includes VECTOR MESH™ elements or nodes, and a VECTOR MESH™ network architecture, neighbor discovery protocol, and routing protocol.

An advantage of implementing a matrix mesh network is that APs trying to reach multiple stations, 3 out of 4 streams could get knocked out and the system would still work. Different streams can survive to get to different stations. It has been shown in a proof of concept that multiple-input multiple-output (MIMO) is more reliable outside than single-input single-output (SISO), and can survive seasonal changes to the environment, such as the elements and foliage growing into the wireless transmission path. In a successful test, poles were placed at between 120 and 170 feet, with intervening obstacles including a thick exterior wall and big trees blocking. The access point locations were approximately 5 feet above the ground, and were operated in the 5 GHz band. The average UDP data rate was 110-120 Mbps and the wireless link rate was 180-200 Mbps. Existing systems have much lower data rates than the proof of concept had.

In the example of FIG. 1, the AP range extension engine 110 is coupled to the wireless network 108. The AP range extension engine 110 can determine what station of multiple stations can act as a UAP. The manner by which the AP range extension engine 110 accomplishes this task is described later.

Figure 2:
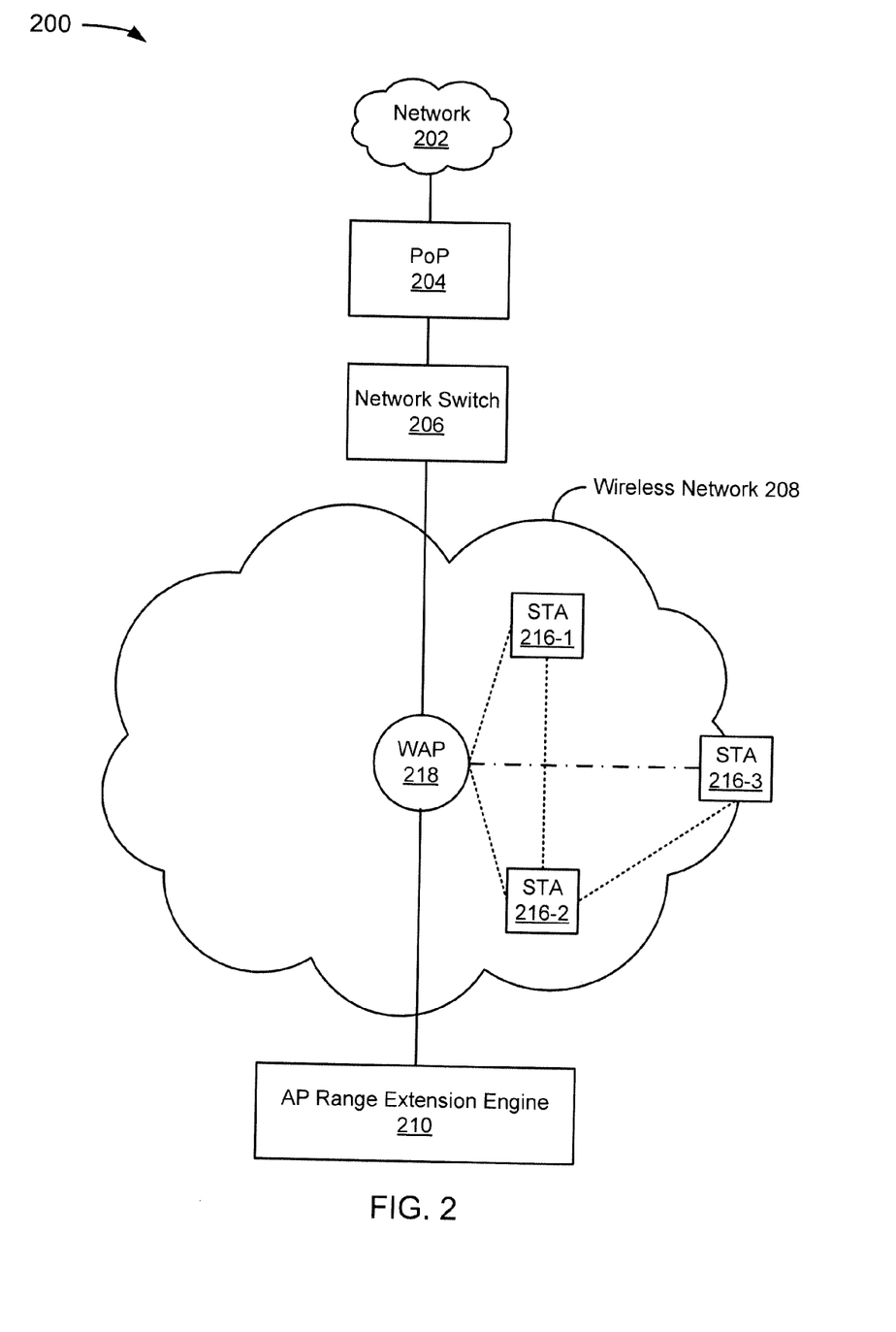
FIG. 2 depicts an example of an alternative extended range AP system.

In an alternative embodiment, the UAP 114 and the WDP 112 are located near one another or combined in a single physical device. FIG. 2 depicts an example of an alternative extended range AP system 200. In the example of FIG. 2, the system 200 includes a network 202, a PoP 204, a network switch 206, a wireless network 208, and an AP range extension engine 210. The components are substantially similar to the components having similar reference numerals (e.g., network 102 is substantially similar to network 202). However, in the example of FIG. 2, the wireless network 208 includes a WAP 218 and does not include an WDP and UAP (see, e.g., FIG. 1, WDP 112, UAP 114).

In the example of FIG. 2, stations that can hear one another can communicate via DSS, as is illustrated by the dotted line between the STA 216-1 and the STA 216-2 and between the STA 216-2 and the STA 216-3. Stations that can hear the WAP 218 can communicate via, e.g., Wi-Fi, as is illustrated by the dotted line between the STA 216-1 and the WAP 218 and between the STA 216-2 and the WAP 218. And stations that cannot hear the WAP 218 can use another station as a repeater, which is illustrated by the two dotted lines connecting the WAP 218 to the STA 216-2 and then to the STA 216-3.

It may be noted that typically the WAP 218 must be aware of every station in the wireless network 208. However, the WAP 218 can detect stations at a conservative modulation and maintain connections with stations for which RSSI drops to below an acceptable threshold (but is still detectable). Thus, stations that would normally be dropped or that would have a poor connection can take advantage of repeater functionality of other stations. The wireless connection between the STA 216-3 and the WAP 218 is represented by a dashed-dotted line in the example of FIG. 2.

It may be noted that it might be desirable to ensure security in the case where a station acts as a repeater for another station, such as STA 216-2 does for STA 216-3 in the example of FIG. 2. For example, an unencrypted packet could potentially reside for a short time on the station that acts as a repeater. This may be acceptable in a home deployment, since the devices can trust one another. In other deployments, it might be desirable to prevent untrusted stations from acting as repeaters. In yet other deployments, the risk could be unacceptable, and the functionality turned off. Alternatively, the security problem could be solved in a convenient manner.

It was mentioned before that the network switch 106 (FIG. 1) and the WDP 112 (FIG. 1) could be combined. Similarly, the network switch 206 and the WAP 218 can be combined into, e.g., a gateway device. In this alternative, STAs 116 can still communicate with one another via DLS and communicate with the AP via, e.g., Wi-Fi.

Figure 3:
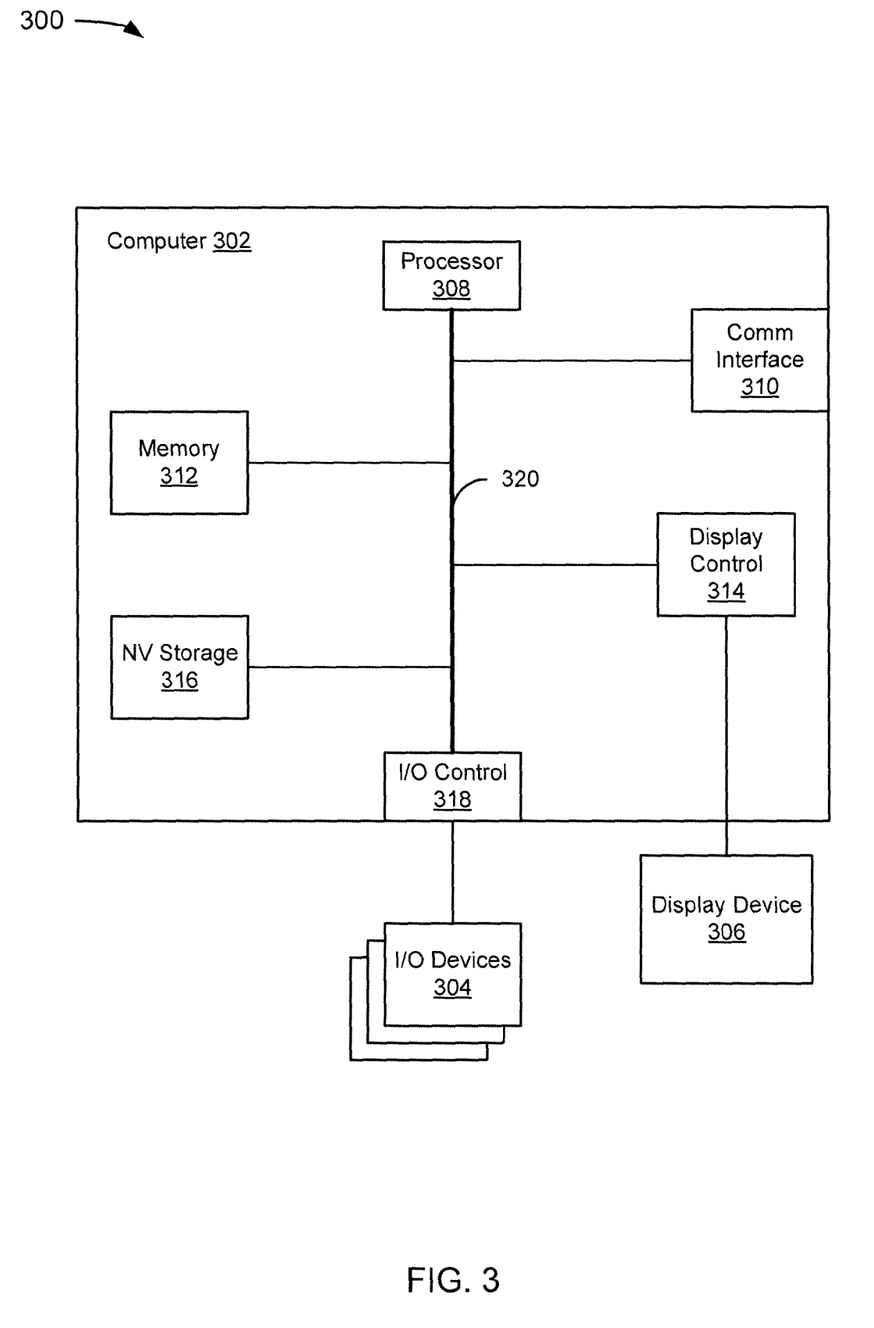
FIG. 3 depicts a computer system that can be used in the system of FIG. 1 or 2.

FIG. 3 depicts a computer system 300 that can be used in the system 100 (FIG. 1) or system 200 (FIG. 2). The computer system 300 may be a conventional computer system that can be used as a client computer system, such as a wireless client or a workstation, or a server computer system. The computer system 300 includes a computer 302, I/O devices 304, and a display device 306. The computer 302 includes a processor 308, a communications interface 310, memory 312, display controller 314, non-volatile storage 316, and I/O controller 318. The computer 302 may be coupled to or include the I/O devices 304 and display device 306. Stations, including APs, will not necessarily need all of the components, but will typically include at least the processor 308, the communications interface 310, and the memory 312.

The computer 302 interfaces to external systems through the communications interface 310, which may include a radio interface, network interface, or modem. It will be appreciated that the communications interface 310 can be considered to be part of the computer system 300 or a part of the computer 302. The communications interface 310 can include a radio, an analog modem, ISDN modem, cable modem, token ring interface, satellite transmission interface (e.g. "direct PC"), or other interfaces for coupling a computer system to other computer systems.

The processor 308 may be, for example, a conventional microprocessor such as an Intel Pentium microprocessor or Motorola power PC microprocessor. The memory 312 is coupled to the processor 308 by a bus 320. The memory 312 can be Dynamic Random Access Memory (DRAM) and can also include Static RAM (SRAM). The bus 320 couples the processor 308 to the memory 312, also to the non-volatile storage 316, to the display controller 314, and to the I/O controller 318.

The I/O devices 304 can include a keyboard, disk drives, printers, a scanner, and other input and output devices, including a mouse or other pointing device. The display controller 314 may control in the conventional manner a display on the display device 306, which can be, for example, a cathode ray tube (CRT) or liquid crystal display (LCD). The display controller 314 and the I/O controller 318 can be implemented with conventional well known technology.

The non-volatile storage 316 is often a magnetic hard disk, an optical disk, or another form of storage for large amounts of data. Some of this data is often written, by a direct memory access process, into memory 312 during execution of software in the computer 302. In general, an engine implemented in the system 300 can include a dedicated or shared processor and, hardware, firmware, or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer system 300 is one example of many possible computer systems which have different architectures. For example, personal computers based on an Intel microprocessor often have multiple buses, one of which can be an I/O bus for the peripherals and one that directly connects the processor 308 and the memory 312 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 312 for execution by the processor 308. A typical computer system will usually include at least a processor, memory, and a bus coupling the memory to the processor.

In addition, the computer system 300 can be controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 316 and causes the processor 308 to execute the various acts required by the operating system to input and output data and to store data in memory, including storing files on the non-volatile storage 316.

An example of a system 300 that might function as a WAP includes an N×M antenna array, a system in package (SIP), and a power source. As used in this paper, a SiP is a number of integrated circuits enclosed in a single package that performs most of the functions of an electronic system, in this specific example a MIMO station. SiP dies containing integrated circuits can be stacked vertically on a substrate and connected by wires. Slightly less dense multi-chip modules can also be used, which place dies on the same plane; and three-dimensional integrated circuits having stacked silicon dies with conductors running through the die can be used. The N×M antenna array can include one or more antennas. (It may be noted that an array of one antenna is normally not referred to as an "array," but the distinction is not critical to an understanding of the example.) Where there are multiple antennas in the array, the antennae can be coupled to a common source or load to produce a directive radiation pattern. The spatial relationship can contribute to the directivity of the antennae. The SiP likely includes an RF front end, a (for example) GbE switch, a digital MIMO processing block, and a power input block. A current implementation provides 0.3 Gbps per unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Systems described in this paper may be implemented on any of many possible hardware, firmware, and software systems. Typically, systems such as those described in this paper are implemented in hardware on a silicon chip. Algorithms described in this paper are implemented in hardware, such as by way of example but not limitation RTL code. However, other implementations may be possible. The specific implementation is not critical to an understanding of the techniques and the claimed subject matter.

Figure 4:
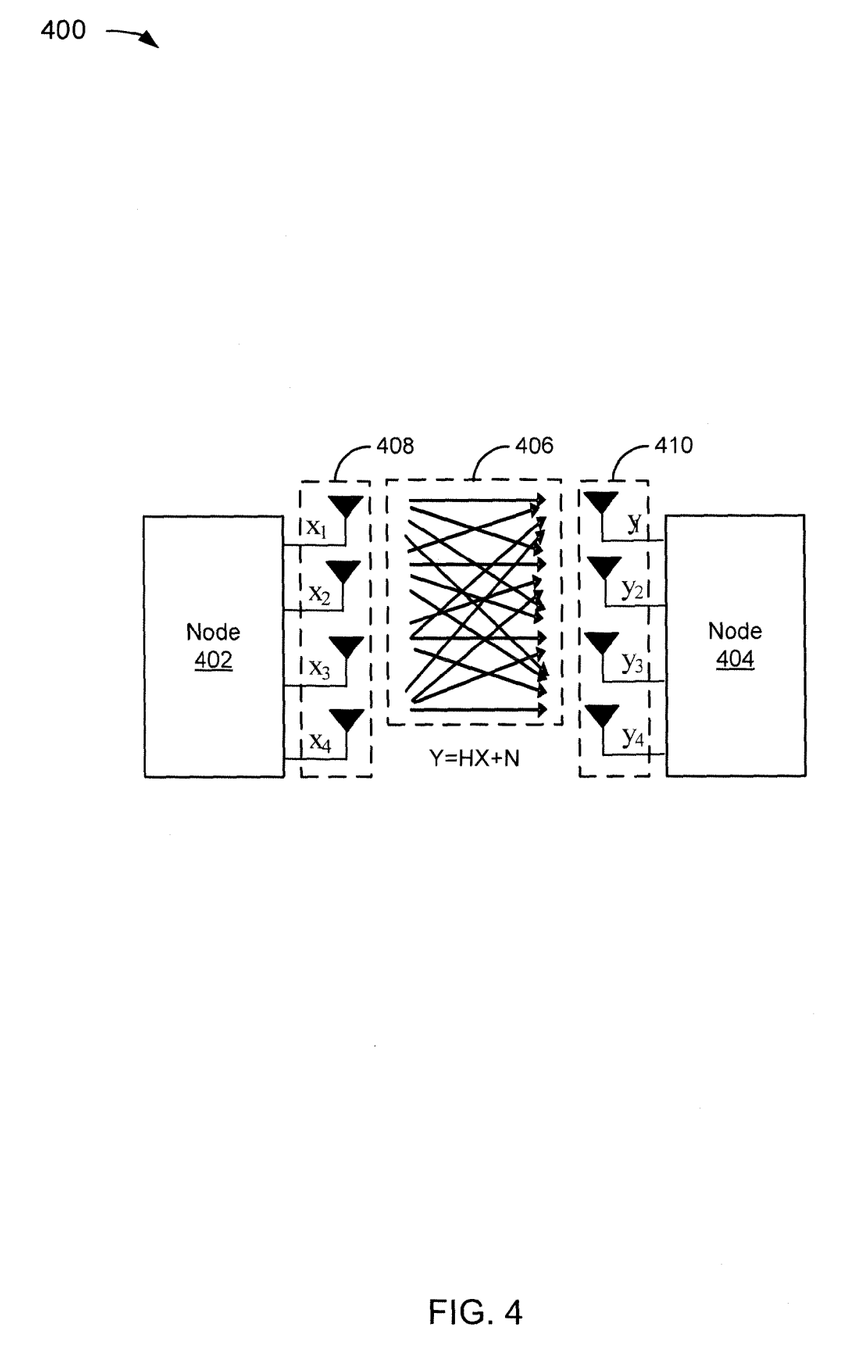
FIG. 4 depicts an example of a MIMO channel between nodes in a wireless network.

FIG. 4 depicts an example of a MIMO channel between nodes in a wireless network. In the example of FIG. 4, a node 402 has, for illustrative purposes only, four transmit antennas $x_1, x_2, x_3$, and $x_4$; and a node 404 has, for illustrative purposes only, four receive antennas $y_1, y_2, y_3$, and $y_4$. The path from the antennas $x_N$ to the antennas $y_M$ may be referred to collectively as a MIMO channel 406.

The MIMO channel 406 is characterized by a matrix H with M rows and N columns, where N is the number of antennas at the node 402, and M is the number of antennas at the node 404. The matrix H describes the channel gains between all transmit-receive antenna pairs of the two matrix mesh elements, i.e. the matrix element $h_{ij}$ in the $i^{th}$ row and $j^{th}$ column of H is the channel gain between the $j^{th}$ transmit antenna and the $i^{th}$ receive antenna. The transmitted signal is a vector $X=[x_1, \ldots x_N]$, where $x_j$ is the signal transmitted from the $j^{th}$ antenna of the node 402. The received signal is a vector $Y=[y_1, \ldots y_M]$, where $y_i$ is the received signal at the $i^{th}$ antenna of the node 404. The received signal at the $i^{th}$ receive antenna is corrupted by noise and possibly interference $n_i$, and the vector $N=[n_1, \ldots, n_M]$ describes the noise and interference associated with all receive antennas. The received signal vector Y is characterized by the matrix multiplication Y=HX+N, i.e.

$$y_i = \sum_{j=1}^{N} h_{ij} x_j + n_i,$$

so that $y_i$ is the sum of signals associated with all transmit signals $x_j$, i=1, ..., N multiplied by the channel gain $h_{ij}$ from the $j^{th}$ transmit antenna to the $i^{th}$ receiver antenna, plus the additive noise $n_i$ associated with the $i^{th}$ receiver antenna.

Depending upon whether there are multiple antennas at a station, in a transmit antenna array, and/or multiple antennas in the receive antenna array, the communication link can be referred to as a MIMO link. It should be noted that multiple-input and single-output (MISO), single-input and multiple-output (SIMO), and SISO are degenerate cases of MIMO. MISO is when the receiver has a single antenna. SIMO is when the transmitter has a single antenna. SISO is when neither the transmitter nor the receiver have multiple antennas. The acronym MIMO could be considered to include the degenerate cases, if applicable. The techniques may also be applicable to multi-user MIMO (MU-MIMO), cooperative MIMO (CO-MIMO), MIMO routing, OFDM-MIMO, or other MIMO technologies. The major consideration with respect to multiple antenna use as it relates to the techniques described in this paper is whether there are multiple antennas at the receiver (MIMO or SIMO) or not (SIMO or SISO). When there are multiple antennas at the receiver, there are typically multiple corresponding RF chains and other components.

The multiple antennas between nodes can be used to increase data rates by creating multiple independent channels between the nodes (e.g., via spatial multiplexing): the maximum number of such data paths that can be created is the minimum of N and M. Alternatively, transmitted signals can be combined via transmit diversity or beamforming, and/or the received signals can be combined via receive diversity, which increases link robustness. Also, beamsteering can he done to steer an antenna beam in a given direction, which increases range and/or reduces interference. These techniques are not mutually exclusive, and some antennas can be used for spatial multiplexing, others for diversity, and still others for beamsteering or beamforming.

Figure 5:
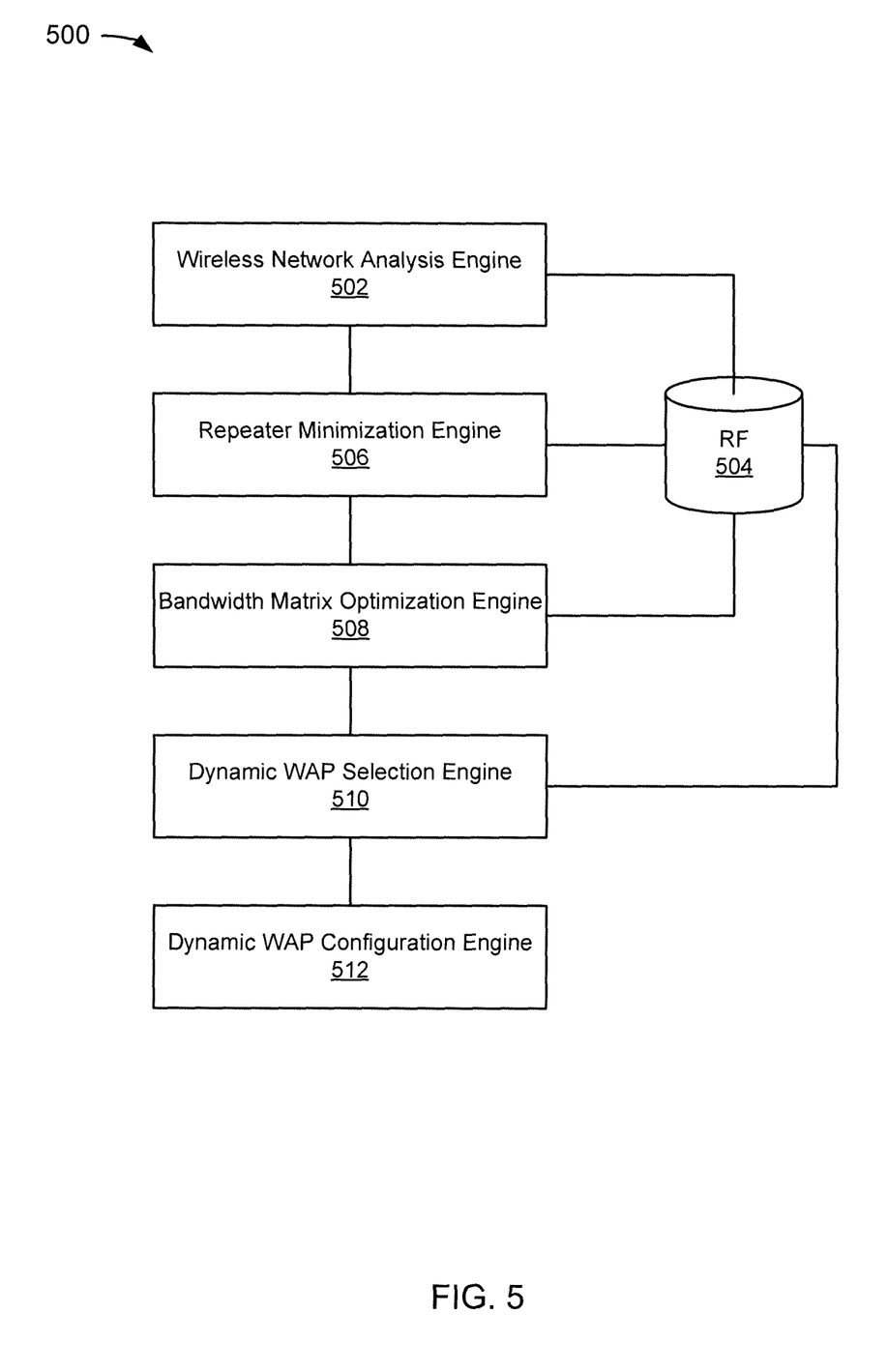
FIG. 5 depicts an example of an AP range extension engine.

FIG. 5 depicts an example of an AP range extension engine 500. The primary function of the AP range extension engine 500 is to determine from a set of stations the station that can operate optimally as a WAP (or UAP) for a wireless network. The AP range extension engine 500 can be implemented on a station, a network switch, or at some other convenient location. The AP range extension can also have functionality that is distributed across more than one system, such as having a portion on a network switch or AP controller and a portion on a station, though where a station provides information in the normal course of operation, e.g., enabling an AP to obtain RSSI values, the AP range extension engine 500 would not be considered to reside on the station.

The AP range extension engine 500 includes a wireless network analysis engine 502, an RF datastore 504, a repeater minimization engine 506, a bandwidth matrix optimization engine 508.

In the example of FIG. 5, the wireless network analysis engine 502 collects information about a wireless network that is useful in determining what station of the wireless network is best suited to act as a WAP. Typically, this information will at least include data about links between stations, but can include other data. For example, the wireless network analysis engine 502 could receive input regarding the floorplan(s) of an area, such as a home. Walls and floors (at least in an implementation of a multi-floor structure) can be detrimental to RF coverage, potentially making it useful for computing optimal AP placement. Of course, the RSSI of signals will already take into account any obstacles through which the signal passed. So the location of obstacles is to some extent implicit in the RSSI. Nevertheless, a system that has more information can still get better results in predicting what will happen if the AP is moved to a new location. Another potential data point is sporadic interference. For example, a microwave oven can cause interference; so it may be desirable to locate an optimal AP some distance away from the microwave oven. Alternatively, it may be desirable to ignore the interference that a microwave oven introduces because it is known that the microwave oven is relatively rarely used, even if it was used while data related to links was collected. Another example is known times of operation. For example, a person may indicate that a television will be on only at certain limited times during the day; so link analysis could be done for data at specific times. Indeed, a different AP could be chosen as optimal for different times of the day. All of that said, the basic functionality of the wireless network analysis engine 502 is analyzing wireless links, and even the simplest implementation of such functionality can be adequate.

In the example of FIG. 5, the RF datastore 504 includes data collected by the wireless network analysis engine 502. The RF datastore 504 can include data similar to that which an AP would maintain for stations in a wireless network. It may be desirable to increase the amount of data to include other RF data, such as stations that are likely to come online. For example, in a HAN, a user may know that a wireless device will be switched on with relative frequency. So the RF datastore can store information associated with the wireless device and the AP range extension engine can treat the station as if it were on when determining an optimal AP. The RF datastore can also store information on known RF obstructions. For example, certain walls or appliances, such as a refrigerator, might be located such that RF communications can be constrained, or a microwave oven can cause interference in a network when it is on, making stations near the microwave oven perhaps less optimal to function as an AP. The amount and type of data stored in the RF datastore will depend upon what is useful to an AP optimization engine in determining which AP is optimum according to implemented algorithms.

In the example of FIG. 5, the repeater minimization engine 506 is coupled to the RF datastore 504. An aspect of optimization in the context of an AP-centric wireless network is minimization of repeaters. For an implementation that includes a repeater minimization engine, it may be a design goal to ensure that communications on a wireless network make use of as few repeaters as possible. In a specific implementation, the repeater minimization engine 506 considers the RF data in the RF datastore 504 and determines from the RF data what subset of stations, if acting as WAPs, could be selected such that all other stations are capable of reaching the WAP with at most one "repeater" between the station and the potential WAP. In a HAN, having more than one hop sacrifices bandwidth, and it also generally means the hidden node problem exists for the wireless network. Where a WAP is placed in a location that minimizes repeaters, the placement can be referred to as "centralized."

In the example of FIG. 5, the bandwidth matrix optimization engine 508 is coupled to the RF datastore 504. The bandwidth matrix optimization engine 508 can make use of an applicable known or convenient optimal path optimization algorithm between nodes of the wireless network. Advantageously, whatever algorithm is used, it can be simplified because of the constraints placed on the system by the repeater minimization engine 506 (e.g., no more than one repeater node for any communication in the wireless network). The bandwidth matrix optimization engine 508 can be configured to enable optimization based upon a time of day, current network conditions, or the like. In a typical HAN implementation, many stations, such as a television, are not moved with any regularity. Other devices might be moved more frequently. It may be noted that current implementations do not include an auto-update function that enables the system to quickly switch between APs when a station moves. However, as processing power increases, it is possible that real-time dynamic AP setting features can be implemented, particularly if limited to certain trusted devices. In any case, the bandwidth matrix optimization engine 508 can pick a station that it considers optimal to serve as WAP for the wireless network based upon the optimal path optimization path within the constraints imposed by the system.

In the example of FIG. 5, the dynamic WAP selection engine 510 identifies an optimal station based upon the bandwidth matrix optimization computation. The dynamic WAP selection engine 510 can select a WAP such that stations switch between gateways. While it is frequently the case that in a SOHO implementation, there is a single gateway, e.g., through a DSL or Internet cable modem, it is frequently the case that a mid- to large-size LAN implementation has a number of linked managed switches, each of which can be thought of as a "gateway." As a station roams, for example, it can change from a first AP associated with a first switch to a second AP associated with a second switch. The dynamic WAP selection engine 510 can take into account the existence of multiple switches when determining where a WAP is to be located. With the knowledge that dynamic WAP selection is possible, a network administrator may be motivated to reduce the number of switches that are used in an implementation.

The dynamic WAP selection engine 510 can also select different optimal WAPs for different protocols in a multi-protocol wireless networks. For example, an AP could be dynamically selected that is optimal for a bluetooth network and a wi-fi network, while still meeting the constraints imposed by the system for the wi-fi network. It is also possible to set different APs for the different wireless networks. Different wireless networks may have different ranges, and some wireless networks may be confined to certain specific locations within a larger, e.g., wi-fi network, making it potentially useful to locate an AP for a smaller network centrally to the smaller network and a different AP centrally in the larger network. APs that function in a different band, such as in a 5 GHz band as opposed to a 2.4 GHz band, can be used to form APs of one band that are on the periphery of the other to further extend the range of the system without introducing multi-hop problems and reducing the likelihood of a hidden node problem. Thus, a wireless network could have an 802.11a-compatible UAP and an 802.11b/g/n-compatible UAP that are not co-located.

For this reason, it may be desirable to include in the RF datastore 504 what network capabilities a device has (e.g., some devices are not capable of operation in the 5 GHz band, while others can operate in both 2.4 GHz and 5 GHz bands). The dynamic WAP selection engine 510 can then select optimized WAP locations for each protocol of a multi-protocol wireless network. Whether a WAP location is optimized can depend upon the capabilities of the stations in a multi-protocol network. For example, if the only station in the basement of a house is not compatible with 802.11a, but is compatible with 802.11b/g/n, it makes no difference whether the 802.11a network extends to the basement, but it is a requirement (for complete coverage, at least) for the 802.11b/g/n network to extend to the basement.

In the example of FIG. 5, the dynamic WAP configuration engine 512 takes the necessary steps to configure a station identified as the optimal station for serving as a WAP for the wireless network. In a multi-protocol wireless network, this can include configuring one or more WAPs for the various protocols. The time it takes to configure the wireless network in accordance with the new WAP may have a bearing on how frequently the dynamic WAP configuration process is conducted, or the dynamic WAP configuration process can be explicitly triggered, e.g., by a user who wants to optimize the WAP for the wireless network.

Figure 6:
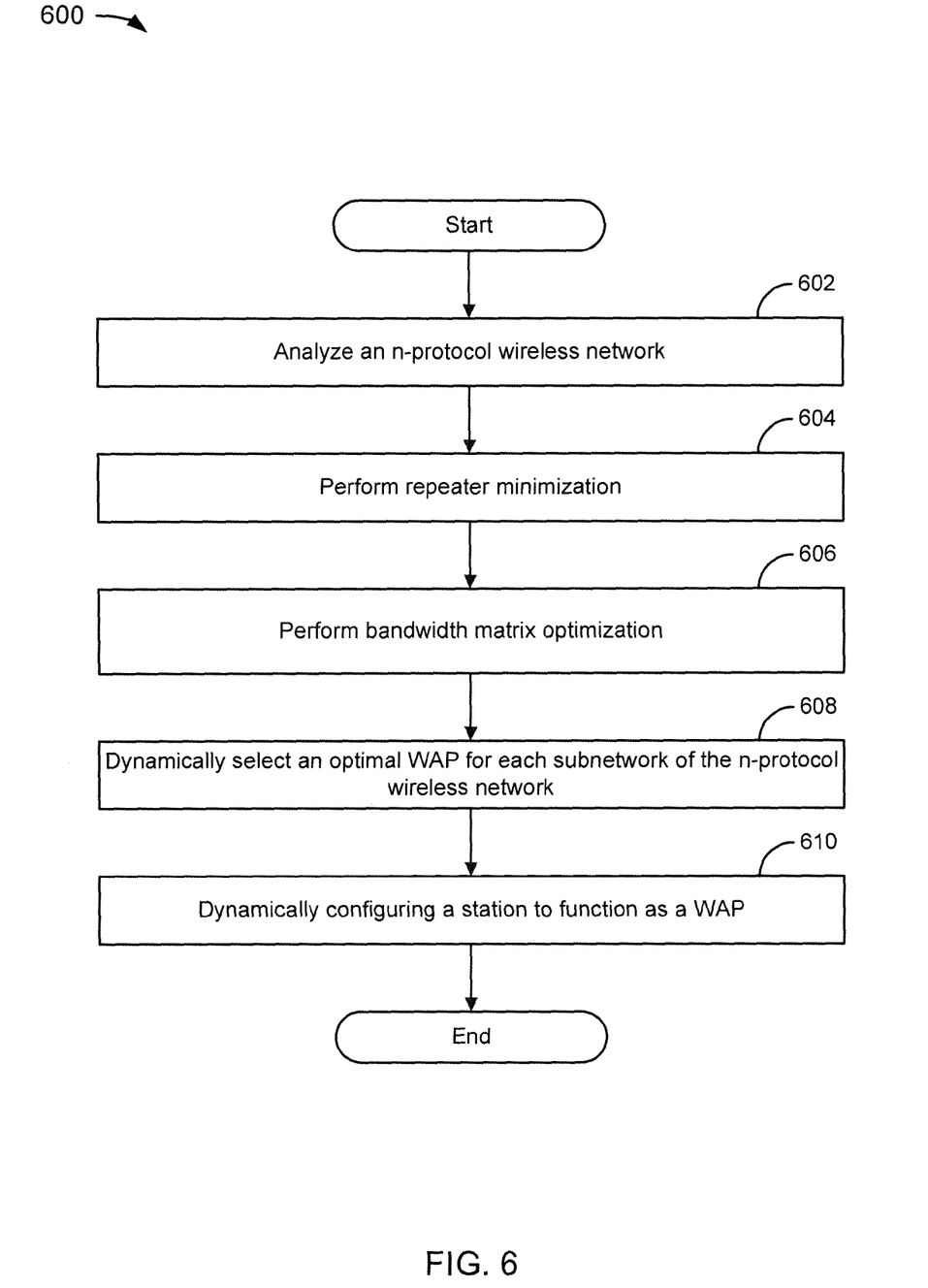
FIG. 6 depicts a flowchart of an example of a method for implementing AP range extension in a multi-protocol wireless network.

FIG. 6 depicts a flowchart 600 of an example of a method for implementing AP range extension in a multi-protocol wireless network. The method is applicable to a single-protocol wireless network, as well. Although this figure depicts functional modules in a particular order for purposes of illustration, the process is not limited to any particular order or arrangement. One skilled in the relevant art will appreciate that the various modules portrayed in this figure could be omitted, rearranged, combined and/or adapted in various ways.

In the example of FIG. 6, the flowchart 600 starts at module 602 with analyzing a n-protocol wireless network. An n-protocol wireless network is one or more wireless networks, but can be considered for some purposes to be a single network with n subnetworks utilizing different wireless protocols. Each of the one or more wireless subnetworks can be analyzed to obtain data about the wireless links between stations in the wireless network. The analysis can make use of additional input, such as floorplans, device capabilities (perhaps accompanied by testing the capabilities of a device capable of operating on more than one of the networks), or other input that is useful for determining which station would be an optimal candidate to function as an AP. Some wireless subnetworks may rely more heavily on input data than others. For example, 802.11a is more likely to suffer from signal degradation from obstacles because signals in the 5 GHz band are more readily absorbed by walls and other solid objects. On the other hand, 802.11b/g/n signals are more prone to interference from other systems, such as microwave ovens, cordless phones, baby monitors, etc., making it perhaps more likely that 802.11b/g/n subnetwork dynamic WAP selection would take into account the location of certain appliances in a home (for a HAN implementation), factory floor, or office. So the data collected when analyzing the n-protocol wireless network can include objective data that is applicable to less than all of the wireless subnetworks.

MIMO systems offer more options regarding link optimization. It would be advantageous for the network analysis to take into account the capabilities of MIMO systems to operate in accordance with one configuration, or switch to a configuration that may be less optimal according to its current operations, but more optimal if the location of the AP were switched. That is, MIMO systems can be more adaptable and the adaptability can be considered when attempting to find an optimal location for a WAP. For this reason, it may be desirable to include MIMO as one of the capabilities of stations in the wireless network, as opposed to a simple measurement of link quality. Techniques for implementing a mesh network are described by way of example in co-pending patent application Ser. No. 12/278,573, filed Aug. 7, 2008, which is incorporated by reference.

In the example of FIG. 6, the flowchart 600 continues to module 604 with performing repeater minimization. Repeater minimization includes eliminating from consideration as a potential WAP those stations that would force triple-hop wireless communications within the wireless network when acting as a WAP. Although repeater minimization can be conducted concurrently with optimal path algorithm implementations, it can dramatically reduce the complexity of such calculations. So conceptually, even if it occurs contemporaneously with optimal path calculations, it is a step that conceptually occurs "before" complex calculations become necessary. That is, it eliminates the need for more complex triple-hop path calculations.

In the example of FIG. 6, the flowchart 600 continues to module 606 with performing bandwidth matrix optimization. Known or convenient techniques can be employed to determine an optimal path, within system-specific constraints. The optimization of paths can be combined with knowledge about the network, including periodic interference, daily routines, or the like.

In the example of FIG. 6, the flowchart 600 continues module 608 with dynamically selecting an optimal WAP for each subnetwork of the n-protocol wireless network. It may be noted that even in a system that has multiple wireless subnetworks, not all of the subnetworks may be subject to dynamic WAP selection. Particularly in the case of PANs, the WAP is unlikely to change and would benefit only modestly by moving it from one place to another, even if the change made sense on some level. For example, bluetooth frequently operationally connects a first bluetooth device to a second bluetooth device and typically the second bluetooth device is coupled to a station on, e.g., a wi-fi or cellular network. The station is for practical purposes always going to be the WAP for the bluetooth network.

Where a system takes into account the capabilities of stations, even if not used (e.g., MIMO capabilities or the ability to operate on both 2.4 GHz and 5 GHz bands), the dynamic selection of a WAP can change. A MIMO station is typically capable of adapting to network conditions to account for distance, interference, or the like. Thus, knowledge of the capabilities of a MIMO station is useful when determining where to dynamically locate a WAP, and would presumably increase the probability that the MIMO station would be selected as the WAP due to the ability of the MIMO station to adapt to conditions to ensure each station can be reached.

In the example of FIG. 6, the flowchart 600 ends at module 610 with dynamically configuring a station to function as a WAP. For each wireless subnetwork for which an optimal WAP is dynamically selected from the stations on the wireless subnetwork, that station is configured to function as a WAP. Other devices can be configured as necessary to operate accordingly.

Systems described herein may be implemented on any of many possible hardware, firmware, and software systems. Typically, systems such as those described herein are implemented in hardware on a silicon chip. Algorithms described herein are implemented in hardware, such as by way of example but not limitation RTL code. However, other implementations may be possible. The specific implementation is not critical to an understanding of the techniques described herein and the claimed subject matter.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
  a network switch for coupling a first network segment to a second network segment, wherein the first network segment includes a wireless network;
  an untethered access point (UAP), wherein the UAP functions as a wireless access point (WAP) for the wireless network;
  a wireless distribution point (WDP) coupled to the network switch and wirelessly operationally connected to the UAP, wherein the WDP functions as a non-WAP station on the wireless network; and
  an access point (AP) range extension engine:
wherein, in operation:
  the UAP receives a message from a station on the wireless network having a destination that is not on the wireless network;
  the WDP receives the message from the UAP;
  the network switch allocates traffic, including the message, from the first network segment to the second network segment, and
  the AP range extension engine performs network analysis to determine which of a plurality of stations on the wireless network can act as the UAP without a first station of the plurality of stations being required to act as a repeater for a second station of the plurality of stations.

* * * * *